(12) United States Patent
Zhang et al.

(10) Patent No.: US 11,976,014 B2
(45) Date of Patent: May 7, 2024

(54) SPECIAL CONTROLLED-RELEASE BACTERIAL FERTILIZER FOR PEANUTS AND PREPARATION METHOD THEREOF

(71) Applicant: Biotechnology Research Center, Shandong Academy of Agricultural Sciences, Shandong (CN)

(72) Inventors: Jialei Zhang, Shandong (CN); Xinguo Li, Shandong (CN); Shubo Wan, Shandong (CN); Feng Guo, Shandong (CN); Jianguo Wang, Shandong (CN); Zheng Zhang, Shandong (CN); Gao Chen, Shandong (CN); Chaohui Tang, Shandong (CN); Sha Yang, Shandong (CN); Zhenying Peng, Shandong (CN); Jingjing Meng, Shandong (CN)

(73) Assignee: Biotechnology Research Center, Shandong Academy of Agricultural Sciences, Jinan (CN)

( * ) Notice: Subject to any disclaimer, the term of this patent is extended or adjusted under 35 U.S.C. 154(b) by 688 days.

(21) Appl. No.: 17/257,381

(22) PCT Filed: Jul. 20, 2020

(86) PCT No.: PCT/CN2020/102903
§ 371 (c)(1),
(2) Date: Dec. 31, 2020

(87) PCT Pub. No.: WO2021/232574
PCT Pub. Date: Nov. 25, 2021

(65) Prior Publication Data
US 2022/0127204 A1 Apr. 28, 2022

(30) Foreign Application Priority Data
May 21, 2020 (CN) .......................... 202010433292.3

(51) Int. Cl.
| | | |
|---|---|---|
| *C05G 3/60* | (2020.01) |
| *C05C 9/02* | (2006.01) |
| *C05G 3/40* | (2020.01) |
| *C05G 5/12* | (2020.01) |
| *C05G 5/30* | (2020.01) |

(52) U.S. Cl.
CPC ................ *C05G 3/60* (2020.02); *C05C 9/02* (2013.01); *C05G 3/40* (2020.02); *C05G 5/12* (2020.02); *C05G 5/37* (2020.02)

(58) Field of Classification Search
CPC ... C05G 3/40; C05G 3/00; C05G 3/60; C05G 3/80; C05G 5/12; C05G 5/37; C05G 5/30; C05C 9/02; C05D 3/00; C05D 9/00; C05F 11/00; C05F 11/02; C05F 11/08; C05F 1/005
See application file for complete search history.

(56) References Cited

FOREIGN PATENT DOCUMENTS

| | | |
|---|---|---|
| CN | 107602251 A | 1/2018 |
| CN | 108129199 A | 6/2018 |
| CN | 111377773 A | 7/2020 |
| CN | 106008117 B | 8/2020 |

*Primary Examiner* — Mina Haghighatian
*Assistant Examiner* — Nathan W Schlientz
(74) *Attorney, Agent, or Firm* — Porus IP LLC

(57) ABSTRACT

The invention relates to the technical field of agricultural planting, in particular to a controlled-release bacterial fertilizer for peanuts and a preparation method of the special controlled-release bacterial fertilizer. The special controlled-release bacterial fertilizer is composed of an inner layer and an outer layer; after the outer layer is released completely, the inner-layer network structure gradually absorbs water and preserves moisture, and has good slow release and controlled release properties, thereby achieving the gradual release of the inner layer, high fertilizer utilization rate, exerting the efficacy of the microbial agent and facilitating the large-area promotion.

3 Claims, No Drawings

SPECIAL CONTROLLED-RELEASE BACTERIAL FERTILIZER FOR PEANUTS AND PREPARATION METHOD THEREOF

TECHNICAL FIELD

The disclosure relates to the technical field of agricultural planting, particularly to a special controlled-release bacterial fertilizer for peanuts and a preparation method thereof.

BACKGROUND

A microbiological bacterial fertilizer is developed according to a soil microecology principle, a plant nutrition principle and a basic conception of modern "organic agriculture". The microbiological bacterial fertilizer contains efficient, active and beneficial microorganism bacteria, which can activate soil nutrients, improves the utilization rate of nutrients, inhibits soil-borne diseases and is suitable for various types of soils to modify the soil and reduce the use of chemical fertilizers and pesticides. However, the currently produced microbiological bacterial fertilizers are applied once and released, so the effective time of the active bacteria difficultly lasts for the whole period of duration of crops.

At present, the slow-release urea formaldehyde fertilizer slowly releases a nitrogen element, is applied once, and cannot meet the demand of the whole crop growth period on the fertilizer if being once applied, so it is necessary to apply the fast-acting nitrogen fertilizer to meet the demand of the earlier crop growth period on the fertilizer.

SUMMARY

Aiming at slow release and controlled release problems existing in the prior art, the disclosure provides a special controlled-release bacterial fertilizer for peanuts.

The disclosure also provides a method for preparing a special controlled-release bacterial fertilizer for peanuts.

In order to realize the above objective, the disclosure adopts the following technical solution:

Provided is a special controlled-release bacterial fertilizer for peanuts, the bacterial fertilizer consisting of an inner layer and an outer layer;

The outer layer: 20-40 parts of fulvic acid, 10-30 parts of chitin, 5-20 parts of alginic acid, 10-12 parts of rice husk carbon, 8-10 parts of cellulose, 0.5-0.8 part of glucolactone, 10-15 parts of sodium carboxymethyl starch, 10-20 parts of modified starch, 3-5 parts of calcium chloride, 100-200 million/g of *bacillus subtilis,* 50-100 million/g of *bacillus gelatinosus,* 100-200 million/g of *bacillus thuringiensis,* 50-100 million/g of *bacillus laterosporus,* 50-100 million/g of *bacillus mucilaginosus,* 50-100 million/g of *streptomyces,* and 50-100 million/g of *Aspergillus niger;*

The inner layer: 10-30 parts of urea formaldehyde powder, 15-20 parts of polyethylene glycol, 30-40 parts of natto powder, 10-30 parts of fulvic acid, 10-30 parts of chitin, 5-20 parts of alginic acid, 100-200 million/g of *bacillus subtilis,* 80-120 million/g of *bacillus gelatinosus,* 100-200 million/g of *bacillus thuringiensis,* 50-100 million/g of *bacillus laterosporus,* 50-100 million/g of paecilomyces lilacinus, 100-200 million/g of Trichoderma aureoviride, 50-100 million/g of *streptomyces*, and 100-200 million/g of *Aspergillus niger*. The relative molecular weight of the cellulose is 80000-100000.

Provided is a method for preparing the special controlled-release bacterial fertilizer for peanuts, comprising the following steps:

(1) uniformly mixing urea formaldehyde powder, polyethylene glycol and ⅓ weight of natto powder in the inner layer, evenly stirring, and then adding 1-fold weight of water, heating to 95° C., stirring for 1 h, then adding the remaining natto powder, evenly mixing, then carrying out ultrasonic treatment for 20 min, cooling to 38° C., adding fulvic acid, chitin, alginate and active bacteria, then pelletizing and drying to obtain an inner core layer; and (2) adding water whose weight is 2 times those of carboxymethyl starch sodium and modified starch into the carboxymethyl starch sodium and modified starch in the outer layer, then heating to 70-80° C., adding calcium chloride, evenly stirring, then adding rice husk carbon and cellulose, evenly stirring, cooling to room temperature, adding the active bacteria, spraying the previously obtained mixture on the inner core layer at room temperature and then drying the prepared particles at low temperature.

The disclosure provides a special controlled-release bacterial fertilizer for peanuts, which can release a microbial agent twice. The fertilizer is applied before sowing and releases the outer-layer microbial bacteria, and the inner-layer microbial bacteria begins to be released in 50-60 days after being applied into the soil.

The disclosure has the beneficial effects that:

(1) promotion of growth: bacillus gelatinosus, bacillus laterosporus and bacillus mucilaginosus in colony generate a large number of plant endogenous enzymes such as chitinase in the process of metabolism to promote the growth of plant root systems; bacillus gelatinosus and bacillus mucilaginosus and the like can immobilize nitrogen, dissolve phosphorus, release potassium, and release calcium, sulfur, silicon, magnesium and the like, so as to improve the absorption and utilization of peanuts on nutrient elements and promote the growth of the plant.

(2) Disease resistance: bacillus subtilis in colony generates a lipopeptide antibiotic that is the most important antibacterial substance and can effectively inhibit root rot and damping off; bacillus gelatinosus is metabolized to generate amino acid substances to inhibit reproduction of harmful and pathogenic microorganisms, reduce the occurrence of damping off, can also improve nutritional deficiency symptoms and inhibit root rot; Trichoderma harzianum and trichoderma aureoviride have protection and treatment effects depending on mechanisms such as nutrition competition, micro parasitism, decomposition of enzymes in cell walls and induction of resistance of peanuts, and can effectively prevent and treat soil borne diseases such as root rot, damping off and fusarium wilt.

(3) Insect resistance: bacillus thuringiensis can kill pests including root knot nematodes, and has specific toxic activity to lepidoptera arthropod larvae and the like (pieris rapae, helicoverpa armigera, and cutworm); paecilomyces lilacinus is an endoparasitic fungus, an important natural enemy of some plant parasitic nematodes, and has a prevention and control effect on multiple nematodes, and is the most effective biocontrol agent to prevent and control root knot nematodes; Trichoderma aureoviride can also directly kill root knot nematodes and underground pests in peanut roots and soil.

(4) Alleviation of continuous cropping obstacles: *Bacillus subtilis, Bacillus thuringiensis* and *Aspergillus niger* can improve the activities of soil urease, soil sucrase and soil alkaline phosphatase, inhibit the growth of harmful fungi, increase the soil nutrient content and total microorganism amount, improve the soil conditions and alleviate the continuous cropping obstacles.

(5) Slow release and controlled release: addition of rice husk carbon and cellulose in the outer layer, on the one hand, can provide an oxygen transport effect for some biological bacteria, and on the other hand, can provide a carbon source when the biological bacteria are fermented. In the process of decomposition, a barrier can be formed for the inner layer in a certain period of time, so as to achieve the function of water and fertilizer conservation; the inner layer can form a cross-linked network structure with good porosity, has high obstruction on the earlier stage. After the outer layer is released completely, the inner-layer network structure gradually absorbs water and preserves moisture, and has good slow release and controlled release properties, thereby achieving the gradual release of the inner layer, high fertilizer utilization rate, exerting the efficacy of the microbial agent and facilitating the large-area promotion.

DESCRIPTION OF THE EMBODIMENTS

The technical solution of the disclosure will be further explained and illustrated through embodiments.

Example 1

A special controlled-release bacterial fertilizer for peanuts:

The outer layer: 30 kg of fulvic acid, 22 kg of chitin, 12 kg of alginic acid, 12 kg of rice husk carbon, 8 kg of cellulose (relative molecular weight is 80000-100000), 0.5 kg of glucolactone, 15 kg of sodium carboxymethyl starch, 15 kg of modified starch, 5 kg of calcium chloride, 200 million/g of *bacillus subtilis*, 100 million/g of *bacillus gelatinosus*, 150 million/g of *Bacillus thuringiensis*, 80 million/g of *Bacillus laterosporus*, 80 million/g of *Bacillus mucilaginosus*, 50 million/g of *streptomyces* and 80 million/g of *Aspergillus niger*.

The inner layer: 24 kg of urea formaldehyde powder, 15 kg of polyethylene glycol, 40 kg of natto powder, 20 kg of fulvic acid, 20 kg of chitin, 20 kg of alginic acid, 200 million/g of *bacillus subtilis*, 100 million/g of *Bacillus gelatinosus*, 150 million/g of *Bacillus thuringiensis*, 80 million/g of *Bacillus laterosporus*, 80 million/g of *Bacillus mucilaginosus*, 80 million/g of paecilomyces lilacinus, 200 million/g of Trichoderma harzianum, 100 million/g of Trichoderma aureoviride, 50 million/g of streptomycete and 80 million/g of *Aspergillus niger*.

The preparation method is as follows:

(1) The urea formaldehyde powder, polyethylene glycol and 1/3 weight of natto powder in the inner layer were evenly mixed, and then 1-fold weight of water was added, the above materials were heated to 95° C. and stirred for 1 h. Then, the remaining natto powder was added. The mixture was evenly stirred and subjected to ultrasonic treatment for 20 min, cooled to 38° C., fulvic acid, chitin, alginic acid and active bacteria were added, and then the above mixture was pelletized and dried to obtain a core inner layer;

(2) Water whose weight was twice those of sodium carboxymethyl starch and modified starch was added in sodium carboxymethyl starch and modified starch in the outer layer, the above materials were heated to 70-80° C., and calcium chloride was added. After the above materials were evenly stirred, rice husk carbon and cellulose were added. The above materials were evenly stirred and cooled to room temperature, the active bacteria were added, the above mixture was sprayed to the inner core layer under room temperature, and then the prepared particles were dried at low temperature.

Example 2

A special controlled-release bacterial fertilizer for peanuts:

The outer layer: 20 kg of fulvic acid, 30 kg of chitin, 12 kg of alginic acid, 12 kg of rice husk carbon, 10 kg of cellulose (relative molecular weight is 80000-100000), 0.8 kg of glucolactone, 10 kg of sodium carboxymethyl starch, 20 kg of modified starch, 3 kg of calcium chloride, 100 million/g of *bacillus subtilis*, 100 million/g of *Bacillus gelatinosus*, 100 million/g of *Bacillus thuringiensis*, 100 million/g of *Bacillus laterosporus*, 100 million/g of *Bacillus mucilaginosus*, 50 million/g of *Streptomyces* and 100 million/g of *Aspergillus niger*.

The inner layer: 10 kg of urea formaldehyde powder, 18 kg of polyethylene glycol, 30 kg of natto powder, 30 kg of fulvic acid, 10 kg of chitin, 18 kg of alginic acid, 100 million/g of *bacillus subtilis*, 100 million/g of *Bacillus gelatinosus*, 100 million/g of *Bacillus thuringiensis*, 100 million/g of *Bacillus laterosporus*, 100 million/g of *Bacillus mucilaginosus*, 50 million/g of paecilomyces lilacinus, 150 million/g of Trichoderma harzianum, 200 million/g of Trichoderma aureoviride, 50 million/g of streptomycete and 100 million/g of *Aspergillus niger*.

The preparation method is the same as that in example 1.

Example 3

A special controlled-release bacterial fertilizer for peanuts:

The outer layer: 40 kg of fulvic acid, 10 kg of chitin, 20 kg of alginic acid, 10 kg of rice husk carbon, 8 kg of cellulose (relative molecular weight is 80000-100000), 1 kg of glucolactone, 10 kg of sodium carboxymethyl starch, 20 kg of modified starch, 4 kg of calcium chloride, 200 million/g of *bacillus subtilis*, 100 million/g of *Bacillus gelatinosus*, 200 million/g of *Bacillus thuringiensis*, 100 million/g of *Bacillus laterosporus*, 50 million/g of *Bacillus mucilaginosus*, 100 million/g of *Streptomyces* and 100 million/g of *Aspergillus niger*.

The inner layer: 30 kg of urea formaldehyde powder, 20 kg of polyethylene glycol, 35 kg of natto powder, 30 kg of fulvic acid, 30 kg of chitin, 10 kg of alginic acid, 200 million/g of bacillus subtilis, 100 million/g of *Bacillus gelatinosus*, 200 million/g of *Bacillus thuringiensis*, 100 million/g of *Bacillus laterosporus*, 50 million/g of *Bacillus mucilaginosus*, 100 million/g of Paecilomyces lilacinus, 100 million/g of Trichoderma harzianum, 200 million/g of Trichoderma aureoviride, 100 million/g of streptomycete and 100 million/g of *Aspergillus niger*.

The preparation method is the same as that in example 1.

Example 4

The formula of a special controlled-release bacterial fertilizer for peanuts is the same as that in example 1.

The preparation method is as follows:

(1) The urea formaldehyde powder, polyethylene glycol and natto powder in the inner layer were evenly mixed, and then 1-fold weight of water was added, and the above materials were heated to 95° C. and stirred for 1 h. The mixture was evenly mixed and subjected to ultrasonic treatment for 20 min and cooled to 38° C., fulvic acid, chitin, alginic acid and active bacteria were added, and then the above mixture was pelletized and dried to obtain a core inner layer;

(2) Water whose weight was twice those of sodium carboxymethyl starch and modified starch was added in sodium carboxymethyl starch and modified starch in the outer layer, the above materials were heated to 70-80° C., and calcium chloride was added. After the above materials were evenly stirred, rice husk carbon and cellulose were added. The above materials were evenly stirred and cooled to room temperature, the active bacteria were added, the above mixture was sprayed to the inner core layer under room temperature, and then the prepared particles were dried at low temperature.

Comparative Example 1

A special controlled-release bacterial fertilizer for peanuts:

The outer layer: 30 kg of fulvic acid, 22 kg of chitin, 12 kg of alginic acid, 20 kg of rice hull carbon, 0.5 kg of glucolactone, 15 kg of sodium carboxymethyl starch, 15 kg of modified starch, 5 kg of calcium chloride, 200 million/g of *bacillus subtilis*, 100 million/g of *Bacillus gelatinosus*, 150 million/g of *Bacillus thuringiensis*, 80 million/g of *Bacillus laterosporus*, 50 million/g of *Bacillus mucilaginosus*, 50 million/g of *Streptomyces* and 80 million/g of *Aspergillus niger*.

The inner layer: 24 kg of urea formaldehyde powder, 15 kg of polyethylene glycol, 1 kg of polyglutamic acid, 20 kg of fulvic acid, 20 kg of chitin, 10 kg of alginic acid, 200 million/g of *bacillus subtilis*, 100 million/g of *Bacillus gelatinosus*, 150 million/g of *Bacillus thuringiensis*, 80 million/g of *Bacillus laterosporus*, 80 million/g of *Bacillus mucilaginosus*, 80 million/g of *Paecilomyces lilacinus*, 200 million/g of Trichoderma harzianum, 100 million/g of Trichoderma aureoviride, 50 million/g of streptomycete and 80 million/g of *Aspergillus niger*.

Comparative Example 2

A special controlled-release bacterial fertilizer for peanuts:

The outer layer: 30 kg of fulvic acid, 22 kg of chitin, 12 kg of alginic acid, 20 kg of cellulose (relative molecular weight is 80000-100000), 0.5 kg of glucolactone, 15 kg of sodium carboxymethyl starch, 15 kg of modified starch, 5 kg of calcium chloride, 200 million/g of bacillus subtilis, 100 million/g of *Bacillus gelatinosus*, 150 million/g of *Bacillus thuringiensis*, 80 million/g of *Bacillus laterosporus*, 50 million/g of *Bacillus mucilaginosus*, 50 million/g of *Streptomyces* and 80 million/g of *Aspergillus niger*.

The inner layer: 24 kg of urea formaldehyde powder, 15 kg of polyethylene glycol, 1 kg of polyglutamic acid, 20 kg of fulvic acid, 20 kg of chitin, 10 kg of alginic acid, 200 million/g of *bacillus subtilis*, 100 million/g of *Bacillus gelatinosus*, 150 million/g of *Bacillus thuringiensis*, 80 million/g of *Bacillus laterosporus*, 80 million/g of *Bacillus mucilaginosus*, 80 million/g of *Paecilomyces lilacinus*, 200 million/g of Trichoderma harzianum, 100 million/g of Trichoderma aureoviride, 50 million/g of streptomycete and 80 million/g of *Aspergillus niger*.

The preparation method is the same as that in example 1.

Comparative Example 3

A special controlled-release bacterial fertilizer for peanuts:

The outer layer: 30 kg of fulvic acid, 22 kg of chitin, 12 kg of alginic acid, 12 kg of rice husk carbon, 8 kg of cellulose (relative molecular weight is 80000-100000), 15 kg of sodium carboxymethyl starch, 15 kg of modified starch, 5 kg of calcium chloride, 200 million/g of *bacillus subtilis*, 100 million/g of *Bacillus gelatinosus*, 150 million/g of *Bacillus thuringiensis*, 80 million/g of *Bacillus laterosporus*, 80 million/g of *Bacillus mucilaginosus*, 50 million/g of *Streptomyces* and 80 million/g of *Aspergillus niger*.

The inner layer: 24 kg of urea formaldehyde powder, 20 kg of fulvic acid, 20kg of chitin, 20 kg of alginic acid, 200 million/g of *bacillus subtilis*, 100 million/g of *Bacillus gelatinosus*, 150 million/g of *Bacillus thuringiensis*, 80 million/g of *Bacillus laterosporus*, 80 million/g of *Bacillus mucilaginosus*, 80 million/g of Paecilomyces lilacinus, 200 million/g of Trichoderma harzianum, 100 million/g of Trichoderma aureoviride, 50 million/g of streptomycete and 80 million/g of *Aspergillus niger*.

The preparation method is as follows:

(1) 1-fold weight of water was added in urea formaldehyde powder in the inner layer, heated to 95° C. and stirred for 1 h, the above mixture was subjected to ultrasonic treatment for 20 min and cooled to 38° C., fulvic acid, chitin, alginic acid and active bacteria were added, and then the above mixture was pelletized and dried to obtain an core inner layer;

(2) Water whose weight was twice those of water whose weight was twice those of former two was added in sodium carboxymethyl starch and modified starch in the outer layer and then heated to 70-80° C., and calcium chloride was added. After the above materials were evenly stirred, rice husk carbon and cellulose were added. The above materials were evenly stirred and cooled to room temperature, the active bacteria were added, the above mixture was sprayed to the inner core layer under room temperature, and then the prepared particles were dried at low temperature.

Effect Example (I) A release rule of effective nitrogen element in field nutrition of bacterial fertilizers provided by examples and comparative examples of the disclosure is detected according to a method provided by patent CN104541726. Specific detection results are shown in Table 1.

TABLE 1

|  | Seedling stage (%) | Floricome stage (%) | Pod bearing stage (%) | Maturity stage(%) |
|---|---|---|---|---|
| Example 1 | 1.35 | 20.79 | 73.15 | 83.27 |
| Example 4 | 1.21 | 17.60 | 64.37 | 78.12 |
| Comparative example 1 | 3.68 | 43.14 | 69.28 | 73.55 |
| Comparative example 2 | 2.15 | 31.28 | 70.33 | 75.29 |
| Comparative example 3 | 5.01 | 57.25 | 67.92 | 72.25 |

II) The same batch of Huayu No.22 peanut seeds was taken as experimental materials, the bacterial fertilizers prepared in examples and comparative examples were applied to an experimental field. Three groups of parallel experiments were conducted for each example and comparative example. 25 kg of bacterial fertilizer was applied in each mu. The blank experimental group was set for sowing, and the overall field was a field after continuous peanut cultivation for 2 years. It was sown on May 1 and harvested on September 20. Each group was kept consistent during the sowing soil, field control, fertilizer and water. Firstly, the incidence of diseases and insect pests in the whole growth cycle was counted. The specific results are shown in Table 2

TABLE 2

|  | Disease rate (%) | Inset pest rate (%) |
|---|---|---|
| Example 1 | 3.1 | 5.4 |
| Example 2 | 3.3 | 6.0 |
| Example 3 | 2.9 | 5.3 |
| Example 4 | 4.8 | 6.5 |
| Comparative example 1 | 6.7 | 8.2 |
| Comparative example 2 | 5.2 | 8.7 |
| Comparative example 3 | 7.7 | 9.2 |

(III) During test, sowing was carried out for the second year. Before and after planting, soil pH, soil urease activity and soil aeration were detected. The specific results are shown in Table 3 (test results after planting).

TABLE 3

|  | Soil pH | Soil urease activity | Aeration degree (%) |
|---|---|---|---|
| Example 1 | 6.98 | 0.96 | 36.32 |
| Example 2 | 6.83 | 0.89 | 35.81 |
| Example 3 | 6.85 | 0.92 | 35.77 |
| Example 4 | 6.82 | 0.83 | 35.12 |
| Comparative example 1 | 6.71 | 0.68 | 34.05 |
| Comparative example 2 | 6.69 | 0.72 | 34.29 |
| Comparative example 3 | 6.63 | 0.65 | 33.91 |
| Control | 5.61 | 0.51 | 28.09 |

The soil planting experimental field was the same area. Soil samples were randomly selected for pH measurement and the average value was taken. Therefore, the pH before planting was considered to be the same, among which, the soil pH before sowing was 5.71; the soil urease activity was 0.55 mg/kg/h; and the soil aeration degree was 30.30%.

(IV) The yield per plant and yield per unit area were counted.

TABLE 4

|  | Example 1 | Example 2 | Example 3 | Example 4 | Comparative example 1 | Comparative exam ple 2 | Comparative exam ple 3 | Blank control |
|---|---|---|---|---|---|---|---|---|
| Yield per plant (g) | 55.1 | 54.9 | 54.3 | 52.8 | 47.6 | 49.2 | 46.2 | 40.6 |
| Yield per unit area (kg/6.67 m$^2$) | 7.12 | 6.87 | 6.69 | 6.11 | 5.73 | 5.96 | 5.62 | 5.10 |

The invention claimed is:

1. A controlled-release bacterial fertilizer for peanuts, wherein the bacterial fertilizer is composed of an inner layer and an outer layer;

the outer layer: 20-40 parts by weight of fulvic acid with respect to the controlled-release bacterial fertilizer, 10-30 parts by weight of chitin, 5-20 parts by weight of alginic acid with respect to the controlled-release bacterial fertilizer, 10-12 parts by weight of rice husk carbon with respect to the controlled-release bacterial fertilizer, 8-10 parts by weight of cellulose with respect to the controlled-release bacterial fertilizer, 0.5-0.8 part by weight of glucolactone with respect to the controlled-release bacterial fertilizer, 10-15 parts by weight of sodium carboxymethyl starch with respect to the controlled-release bacterial fertilizer, 10-20 parts by weight of modified starch with respect to the controlled-release bacterial fertilizer, 3-5 parts by weight of calcium chloride with respect to the controlled-release bacterial fertilizer, 100-200 million/g of bacillus subtilis, 50-100 million/g of bacillus gelatinosus, 100-200 million/g of bacillus thuringiensis, 50-100 million/g of bacillus laterosporus, 50-100 million/g of bacillus mucilaginosus, 50-100 million/g of streptomyces, and 50-100 million/g of Aspergillus niger;

the inner layer: 10-30 parts by weight of urea formaldehyde powder with respect to the controlled-release bacterial fertilizer, 15-20 parts by weight of polyethylene glycol with respect to the controlled-release bacterial fertilizer, 30-40 parts by weight of natto powder with respect to the controlled-release bacterial fertilizer, 10-30 parts by weight of fulvic acid with respect to the controlled-release bacterial fertilizer, 10-30 parts by weight of chitin with respect to the controlled-release bacterial fertilizer, 5-20 parts by weight of alginic acid with respect to the controlled-release bacterial fertilizer, 100-200 million/g of bacillus subtilis, 80-120 million/g of bacillus gelatinosus, 100-200 million/g of bacillus thuringiensis, 50-100 million/g of bacillus laterosporus, 50-100 million/g of paecilomyces lilacinus, 100-200 million/g of Trichoderma aureoviride, 50-100 million/g of streptomyces, and 100-200 million/g of Aspergillus niger.

2. The controlled-release bacterial fertilizer for peanuts according to claim 1, wherein the relative molecular weight of the cellulose is 80000-100000.

3. A method for preparing the controlled-release bacterial fertilizer for peanuts according to claim 1, wherein the method comprises the following steps:
(1) uniformly mixing urea formaldehyde powder, polyethylene glycol and ⅓ weight of natto powder in the inner layer, evenly stirring, and then adding 1-fold weight of water, heating to 95° C., stirring for 1 h, then adding the remaining natto powder, evenly mixing, then carrying out ultrasonic treatment for 20 min, cooling to 38° C., adding fulvic acid, chitin, alginate and active bacteria, then pelletizing and drying to obtain an inner core layer; and (2) adding water whose weight is 2 times those of carboxymethyl starch sodium and modified starch into the carboxymethyl starch sodium and modified starch in the outer layer, then heating to 70-80° C., adding calcium chloride, evenly stirring, then adding rice husk carbon and cellulose, evenly stirring, cooling to room temperature, adding the active bacteria, spraying the previously obtained mixture on the inner core layer at room temperature and then drying the prepared particles at low temperature.

* * * * *